United States Patent
Ahn et al.

(10) Patent No.: US 9,505,923 B2
(45) Date of Patent: Nov. 29, 2016

(54) TRANSPARENT ABS RESIN COMPOSITION HAVING SUPERIOR SHOCK RESISTANCE, SCRATCH RESISTANCE, AND TRANSPARENCY

(71) Applicant: Cheil Industries Inc., Gumi-si (KR)

(72) Inventors: Jun Hwan Ahn, Uiwang-si (KR); Il Jin Kim, Uiwang-si (KR); Jae Wang Lee, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 170 days.

(21) Appl. No.: 14/369,030

(22) PCT Filed: Dec. 11, 2012

(86) PCT No.: PCT/KR2012/010742
§ 371 (c)(1),
(2) Date: Jun. 26, 2014

(87) PCT Pub. No.: WO2013/100439
PCT Pub. Date: Jul. 4, 2013

(65) Prior Publication Data
US 2015/0051333 A1    Feb. 19, 2015

(30) Foreign Application Priority Data
Dec. 30, 2011  (KR) .................... 10-2011-0147277

(51) Int. Cl.
C08L 33/20 (2006.01)
C08L 25/12 (2006.01)
(Continued)

(52) U.S. Cl.
CPC .............. *C08L 33/20* (2013.01); *C08F 279/02* (2013.01); *C08L 25/12* (2013.01); *C08L 55/02* (2013.01); *C08L 2201/10* (2013.01)

(58) Field of Classification Search
CPC ..................................................... C08L 55/02
See application file for complete search history.

(56) References Cited

U.S. PATENT DOCUMENTS 3,787,522 A    1/1974   Dickie et al.
5,891,962 A    4/1999   Otsuzuki et al.
(Continued)

FOREIGN PATENT DOCUMENTS

CN   1860175 A    11/2006
EP   0703252 A2    3/1996
(Continued)

OTHER PUBLICATIONS

English Machine Translation of KR100792122 B1 Obtained Feb. 1, 2016 at http://worldwide.espacenet.com/publicationDetails/biblio?CC=KR&NR=100792122B1&KC=B1&FT=D&ND=4&date=20080104&DB=EPODOC&locale=en_EP.*
(Continued)

*Primary Examiner* — Ling Choi
*Assistant Examiner* — Lanee Reuther
(74) *Attorney, Agent, or Firm* — Additon, Higgins & Pendleton, P.A.

(57) ABSTRACT

A transparent ABS resin composition of the present invention comprises: an acrylonitrile-butadiene-styrene graft (g-ABS) copolymer which is copolymerized by mixture of acrylate based monomer, styrene based monomer, and acrylonitrile based monomer (a2) on butadiene based rubber polymer (a1); and (B) a styrene-acrylonitrile based copolymer, satisfies a relation denoted by Equation 1 and Equation 2 below, and has excellent impact resistance, scratch resistance, and transparency:

$$0 \le |X-Y| \le 0.005 \quad \text{(Equation 1)}$$

$$0 \le |X-Z| \le 0.005 \quad \text{(Equation 2)}$$

In the Equations, X is refractive index of the acrylonitrile-butadiene-styrene graft (g-ABS) copolymer, Y is refractive index of the butadiene based rubber polymer (a1), and Z is refractive index of the styrene-acrylonitrile based copolymer (B).

14 Claims, 2 Drawing Sheets

(51) Int. Cl.
*C08L 55/02* (2006.01)
*C08F 279/02* (2006.01)

(56) References Cited

U.S. PATENT DOCUMENTS

| | | |
|---|---|---|
| 7,579,406 B2 | 8/2009 | Choi et al. |
| 2003/0004278 A1* | 1/2003 | Asano ................. C08F 8/16 525/330.6 |

FOREIGN PATENT DOCUMENTS

| | | |
|---|---|---|
| JP | 63-42940 B2 | 8/1988 |
| KR | 10-2003-0033236 A | 5/2003 |
| KR | 10-2006-0016853 A | 2/2006 |
| KR | 10-0564816 B1 | 3/2006 |
| KR | 10-0792122 B1 | 1/2008 |
| KR | 100792122 B1 * | 1/2008 |
| WO | 2013/100439 A1 | 7/2013 |

OTHER PUBLICATIONS

International Search Report in counterpart International Application No. PCT/KR2012/010742 dated Mar. 25, 2013, pp. 1-4.

* cited by examiner

TRANSPARENT ABS RESIN COMPOSITION HAVING SUPERIOR SHOCK RESISTANCE, SCRATCH RESISTANCE, AND TRANSPARENCY

CROSS-REFERENCE TO RELATED APPLICATIONS

This application claims priority to and the benefit of International Application No. PCT/KR2012/010742, filed Dec. 11, 2012, which published as WO 2013/100439 on Jul. 4, 2013, and Korean Patent Application No. 10-2011-0147277, filed in the Korean Intellectual Property Office on Dec. 30, 2011, the entire disclosure of each of which is incorporated herein by reference.

FIELD OF THE INVENTION

The present invention relates to transparent ABS resin composition. More particularly, the present invention relates to transparent ABS resin composition that has excellent impact strength, scratch resistance, and transparency.

BACKGROUND OF THE INVENTION

Acrylonitrile-butadiene-styrene copolymer resin (ABS resin) is widely used for vehicle parts, home appliances, toys, stationeries, and other applications by having excellent mechanical strength and outer appearance due to the hardness and chemical resistance of acrylonitrile, the impact resistance of butadiene, and the processability of styrene. However ABS resin is opaque, and has a weakness of the limitation in usage for parts requiring transparency. Therefore, the development of transparent resins is well underway recently.

Transparent resins mainly used for products requiring transparency include SAN, PC, GPPS, PMMA, transparent ABS resin, and the like.

So far, technologies for producing transparent resin with excellent transparency and physical properties include a method of applying impact resistance to transparent PMMA resin which is disclosed in U.S. Pat. No. 3,787,522 and Japanese Patent Publication No. showa 63-42940. However, this material has excellent transparency and processability, but has extremely weak impact resistance, thereby having an application limit. Also, European Patent No. 0703252 disclosed a method for applying transparency to HIPS resin, but this material degrades chemical resistance and scratch resistance. Meanwhile, researches for the transparent ABS resin which has relatively high chemical resistance and scratch resistance have been developed, but have limits on the pencil hardness maintaining at 2B or 3B.

Accordingly, the present inventors have developed transparent ABS resin composition that has excellent transparency as well as physical properties including impact resistance and scratch resistance by overcoming said problems of existing technologies.

PURPOSE OF THE INVENTION

The present invention provides novel ABS resin composition that can have excellent transparency.

The present invention also provides the transparent ABS resin composition that can have excellent transparency without degrading impact resistance and scratch resistance.

The aforementioned and other objects of the present invention will be achieved by the present invention as described below.

SUMMARY OF THE INVENTION

To achieve the technical subject, the present invention provides transparent ABS resin composition comprising (A) acrylonitrile-butadiene-styrene graft (g-ABS) copolymer which is copolymerized by monomer mixture of acrylate based monomer, styrene based monomer, and acrylonitrile based monomer (a2) on butadiene based rubber polymer (a1); and (B) styrene-acrylonitrile based copolymer, wherein refractive index of said components satisfies the relation denoted by Equation 1 and Equation 2.

$$0 \leq |X-Y| \leq 0.005 \quad \text{(Equation 1)}$$

$$0 \leq |X-Z| \leq 0.005 \quad \text{(Equation 2)}$$

wherein, X is the refractive index of the acrylonitrile-butadiene-styrene graft (g-ABS) copolymer (A), Y is the refractive index of the butadiene based rubber polymer (a1), and Z is the refractive index of the styrene-acrylonitrile based copolymer (B).

The ABS resin composition preferably comprises about 5 to about 75% by weight of the acrylonitrile-butadiene-styrene graft (g-ABS) copolymer, and about 25 to about 95% by weight of the styrene-acrylonitrile based copolymer.

The acrylonitrile-butadiene-styrene graft (g-ABS) copolymer (A) may be copolymerized by monomer mixture of acrylate based monomer, styrene based monomer, and acrylonitrile based monomer (a2) on butadiene based rubber polymer (a1) in a graft ratio of about 55 to about 80%. The acrylonitrile-butadiene-styrene graft (g-ABS) copolymer (A) may comprise about 40 to about 60% by weight of butadiene based rubber polymer (a1), and about 40 to about 60% by weight of monomer mixture (a2).

The monomer mixture (a2) preferably comprises about 40 to about 80% by weight of the acrylate based monomer, about 10 to about 40% by weight of the styrene based monomer, and about 1 to about 20% by weight of the acrylonitrile based monomer.

The butadiene based rubber polymer (a1) preferably may have an average particle diameter of about 0.07 to about 0.15 μm, gel content of about 60 to about 95% by weight, and the swelling index of about 10 to about 30.

The transparent ABS resin composition preferably has a weight average molecular weight of about 30,000 to about 100,000 g/mol.

The detailed description of the present invention based on attached drawings is as described below.

Effect of the Invention

The transparent ABS resin composition according to the present invention has excellent transparency without degrading impact resistance and scratch resistance.

DETAILED DESCRIPTION OF THE INVENTION

Figure 1:
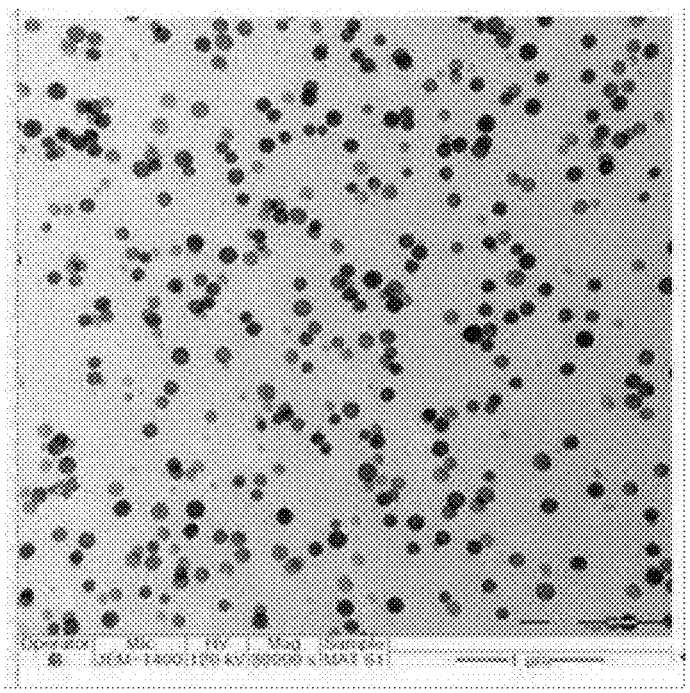
FIG. 1 is a TEM photograph of Example 1.

The transparent ABS resin composition according to the present invention comprises an acrylonitrile-butadiene-styrene graft (g-ABS) copolymer (A) and a styrene-acrylonitrile based copolymer (B). The detailed description of each component is as described below.

(A) Acrylonitrile-Butadiene-Styrene Graft (g-ABS) Copolymer

The acrylonitrile-butadiene-styrene graft (g-ABS) copolymer (A) of the present invention is prepared by graft-copolymerizing a monomer mixture (a2) of acrylate based monomer, styrene based monomer, and acrylonitrile based monomer on butadiene based rubber polymer (a1). The g-ABS copolymer (A) is preferably polymerized in a graft ratio of about 55 to about 80%. When the graft ratio is less than about 55%, coagulated rubber of double particles or multiple particles is produced due to the collision of rubber during polymerization, and thereby inhibiting transparency, and when the graft ratio is greater than about 80%, the increase of impact efficiency is incapable, thereby unfavorable for industrial production. Therefore, dispersing efficiency is maximized when the graft ratio is within said range, and excellent impact resistance can be obtained although using low contents of rubber components for the improvement of transparency.

Polybutadiene or styrene-butadiene copolymer can be used as the butadiene based rubber polymer (a1), and the polybutadiene is preferable.

Using the butadiene based rubber polymer (a1) having an average particle diameter of about 0.07 to about 0.15 μm is preferable. If the average particle diameter exceeds about 0.15 μm, the impact strength increases but the light transmittance is decreased by containing particles having a similar size with the wavelength of visible light, thereby degrading transparency, and if the average particle diameter is less than about 0.07 μm, the properties of rubber absorbing impact decreases, thereby remarkably degrading impact strength.

Also, the butadiene based rubber polymer (a1) comprises about 60 to about 95% by weight of gel content, and preferably has swelling index of about 10 to about 30. The transparency of a final product can be degraded when the butadiene based rubber polymer is out of said range.

The acrylate based monomer is preferably (meth)acrylic acid alkyl ester having $C_2$-$C_{20}$, which includes (meth)acrylic acid methyl ester, (meth)acrylic acid ethyl ester, (meth)acrylic acid propyl ester, (meth)acrylic acid 2-ethylhexyl ester, (meth)acrylic acid decyl ester, (meth)acrylic acid lauryl ester, methyl (meth)acrylate, butyl (meth)acrylate, and acrylic acid 2-ethylhexyl ester, and the like. The methyl (meth)acrylate is preferable.

The styrene based monomer includes styrene, α-ethyl styrene, α-methyl styrene, p-methyl styrene, o-t-butyl styrene, bromo styrene, chloro styrene, trichloro styrene, or a combination thereof. The styrene is preferable.

The acrylonitrile based monomer includes acrylonitrile, methacrylonitrile, fumaronitrile, or a combination thereof. The acrylonitrile is preferable.

The refractive index of the monomer mixture (a2) used for producing the g-ABS copolymer (A) significantly affects transparency, and the refractive index is adjusted by the amount and mixture ratio of the monomers. Thus, in order to have transparency, the refractive index of the butadiene based rubber polymer (a1) used for producing the g-ABS copolymer (A), and the refractive index of the g-ABS copolymer (A) have to be similar. The refractive index after the polymerization of each component used for producing the g-ABS copolymer (A) is about 1.518 for the polybutadiene, about 1.489 for methyl methacrylate, about 1.592 for styrene, and about 1.520 for acrylonitrile, and the difference between the refractive index of the butadiene based rubber polymer (a1) and the refractive index of the g-ABS copolymer (A) preferably satisfies the following Equation:

$$0 \leq |X-Y| \leq 0.005 \quad \text{(Equation 1)}$$

In the Equation, X is the refractive index of the acrylonitrile-butadiene-styrene graft (g-ABS) copolymer, and Y is the refractive index of the butadiene based rubber polymer (a1).

In the present invention, the g-ABS copolymer (A) preferably comprises about 40 to about 60% by weight of butadiene based rubber polymer (a1) and about 40 to about 60% by weight of monomer mixture (a2). When the amount of butadiene based rubber polymer (a1) is less than about 40% by weight, impact resistance is rapidly decreased due to the widening of distances between rubber particles. Also, when the amount of butadiene based rubber polymer (a1) is greater than about 60% by weight, large amount of coagulation is generated due to unstable polymerization, gloss is deteriorated due to the shortage of graft layer formation, and the problems of drying are generated due to the formation of coarse particles during a coagulation process.

The monomer mixture (a2) preferably comprises about 40 to about 80% by weight of the acrylate based monomer, about 10 to about 40% by weight of the styrene based monomer, and about 1 to about 20% by weight of the acrylonitrile based monomer. When the content of the monomer mixture (a2) is out of said range, haze is increased due to the refractive index difference between the butadiene based rubber polymer (a1) and the g-ABS copolymer (A).

The transparent ABS resin composition comprises about 5 to about 75% by weight of the g-ABS copolymer (A).

(B) Styrene-Acrylonitrile Based Copolymer

The styrene-acrylonitrile based copolymer (B) according to the present invention is prepared by copolymerizing about 40 to about 80% by weight of acrylate based monomer, about 10 to about 40% by weight of styrene based monomer, and about 1 to about 20% by weight of acrylonitrile based monomer.

The acrylate based monomer, the styrene based monomer, and the acrylonitrile based monomer can be selected from the same components used for producing the g-ABS copolymer (A).

About 40 to about 80% by weight of the acrylate based monomer can be preferably used. Excellent hardness, scratch resistance, and transparency are secured by using said content of the acrylate based monomer.

About 10 to about 40% by weight of the styrene based monomer can be preferably used. Excellent transparency is secured by using said content of the styrene based monomer.

About 1 to about 20% by weight of the acrylonitrile based monomer can be preferably used. Excellent impact strength is secured by using said content of the acrylonitrile based monomer, and effect of preventing the yellowing which affecting the color of a product is provided.

The amount and mixture ratio of monomers used for producing the styrene-acrylonitrile based copolymer (B) are very crucial elements for the preparation of a transparent resin, thereby the refractive index changes due to said values. Thus, the refractive indexes of the g-ABS copolymer (A) and the styrene-acrylonitrile based copolymer (B) have to be similar, and the difference of the refractive indexes preferably satisfies Equation 2 below:

$$0 \leq |X-Z| \leq 0.005 \quad \text{(Equation 2)}$$

In the Equation, X is the refractive index of the acrylonitrile-butadiene-styrene graft (g-ABS) copolymer (A), and Z is the refractive index of the styrene-acrylonitrile based copolymer (B).

A molecular weight adjusting agent can be used for adjusting the molecular weight, when the styrene-acrylonitrile based copolymer (B) is prepared. The molecular weight adjusting agent includes mercaptans including n-dodecyl mercaptan, t-dodecyl mercaptan, and the like.

The styrene-acrylonitrile based copolymer (B) may preferably have a weight average molecular weight of about 80,000 to about 300,000 g/mol. The impact strength of the final product is excellent within said range of the weight average molecular weight, and flowability is excellent, thereby improving processability.

A production method of the styrene-acrylonitrile based copolymer (B) is not specifically limited, but suspension polymerization or mass-polymerization can be used, and a continuous mass-polymerization is particularly preferable by improving the hardness of the styrene-acrylonitrile based copolymer (B). An emulsifier or a dispersing agent is used when the styrene-acrylonitrile based copolymer (B) is produced by using emulsion polymerization or mass-polymerization, but the emulsifier or the dispersing agent remains in the resin after dehydration, thereby degrading the hardness of the resin.

The transparent ABS resin composition comprises about 25 to about 95% by weight of the styrene-acrylonitrile based copolymer (B).

Transparent ABS Resin Composition

The transparent ABS resin composition according to the present invention is prepared by melt compounding about 5 to about 75% by weight of g-ABS copolymer (A) and about 25 to about 95% by weight of styrene-acrylonitrile based copolymer (B).

The transparent ABS resin composition preferably comprises about 2 to about 30 parts by weight of butadiene based rubber polymer (a1) based on about 100 parts by weight of the transparent ABS resin composition. By using small amount of rubber components, excellent transparency can be secured, and the decrease of impact resistance is prevented by using the ABS graft copolymer (A) with high graft ratio. The impact resistance efficiency is secured while using the small amount of rubber components, thereby securing scratch resistance due to the increase of surface hardness, and reducing the manufacturing costs of product.

The transparent ABS resin composition preferably has a weight average molecular weight of about 30,000 to about 100,000 g/mol. Within the range of the weight average molecular weight, the impact strength of a final product is excellent, and the flowability is improved, thereby offering excellent processability.

The transparent ABS resin composition of the present invention can comprise one or more additives selected from the group consisting of thermal stabilizers, releasing agents, dispersing agents, anti-dripping agents, weather resistant agents, inorganic fillers, and inorganic fibers.

The transparent ABS resin composition of the present invention has about 30 or more of un-notched IZOD impact strength (¼"), the pencil hardness of H to 2H, and offers high transparency similar to the level of PMMA with a haze value about 1.0% or less without degrading impact resistance and scratch resistance.

Production Method of Transparent ABS Resin Composition

First Step—First Graft Reaction

Monomer mixture (a2) comprising acrylate based monomer, styrene based monomer, and acrylonitrile based monomer is inserted into a reactor with ion-exchanged water, emulsifier, molecular weight control agent, and fat-soluble polymerization initiator under the presence of butadiene based rubber polymer (a1), and temperature is increased from about 50 to about 80° C. before adding redox based initiating catalyst to perform first graft polymerization. The butadiene based rubber polymer (a1) preferably has an average particle diameter of about 0.07 to about 0.15 µm, a gel content of about 60 to about 95%, and a swelling index of about 10 to about 30.

The g-ABS copolymer (A) of the present invention is produced by using about 40 to about 60% by weight of the butadiene based rubber polymer (a1) and about 40 to about 60% by weight of the monomer mixture (a2), and the monomer mixture (a2) preferably comprises about 40 to about 80% by weight of the acrylate based monomer, about 10 to about 40% by weight of the styrene based monomer, and about 1 to about 20% by weight of the acrylonitrile based monomer.

Also, about 10 to about 30% by weight of the entire monomer mixture (a2) is preferably added in the first step (I), and the remaining about 70 to about 90% by weight of the monomer mixture (a2) is added in a second step (II) as described below. When less than about 10% by weight of the monomer mixture is used for the first step, impact strength of a product can be degraded by the reduction of graft polymer inside a rubber polymer. However, when more than about 30% by weight of monomer mixture is used for the first step, the formation of graft shell layer is reduced by the increase of the graft polymer inside the rubber polymer, thereby degrading reaction stability, producing the large amount of coagulation, exposing the rubber material polymer by the lack of external shell layers on the outside of the rubber polymer, and degrading gross, color stability, and impact strength. The first step is preferably polymerized until the polymerization conversion rate reaches about 90% or more.

Second Step—Second Graft Reaction (g-ABS Copolymer Preparation)

Water-soluble polymerization initiator is additionally inserted into and stirred with the mixture of the first step when the polymerization conversion rate reaches about 90% or more; and about 70 to about 90% by weight of monomer mixture (a2) remaining after the first step and molecular weight control agent are successively inserted into the mixture at about 65 to about 75° C. for about 2 to about 5 hours to perform second graft polymerization.

In the second step, if the insertion time of the monomer mixture (a2) and the like is less than about 2 hours, the controlling reaction heat can be difficult due to the increase of the amount of monomers inserted within unit time, the quality of the product can be unstabilized, and the generation of coagulation increases. Meanwhile, if the successive insertion time exceeds about 5 hours, the polymerization time can be extended and the productivity can be decreased.

When the successive insertion is finished, the temperature of the reactor can be maintained at about 65 to about 75° C. for about 20 to about 120 minutes, and the product is forcibly cooled when the final polymerization conversion rate reaches about 93 to about 98% for the finishing of polymerization.

Through the aforementioned processes, acrylonitrile-butadiene-styrene graft copolymer (A) having a core-shell structure in which surface of rubber is surrounded by graft polymer is prepared, which has graft ratio of about 55 to about 80%.

Third Step—Melt-Compounding of g-ABS Copolymer (A) and SAN Based Copolymer (B)

Final transparent ABS resin composition can be produced by melt-compounding the g-ABS copolymer (A) produced by the first and second steps, and the previously prepared styrene-acrylonitrile based copolymer (B). About 5 to about 75% by weight of the g-ABS copolymer (A) and about 25 to about 95% by weight of the styrene-acrylonitrile based copolymer (B) are preferably used, respectively for comprising about 2 to about 30 parts by weight of rubber based on about 100 parts by weight of the transparent ABS resin composition.

Each component for the polymerization reaction of the first and second steps is as described below.

The fat-soluble polymerization initiator used in the first step (I) can be selected from the group consisting of acetylchlorohexyl sulfonylperoxide, 2-2' azobis-2,4-dimethylvaleronitrile, 2-2' azobis-(2-amidino propane)dehydrochloride, lauroylperoxide, 2-2'-azobis isobutyronitrile, benzoylperoxide, dimethyl-2-2'-azobis isobutyronitrile, 4,4'-azobis-4-cyanovaleric acid, and combinations thereof. The 2-2'-azobis isobutyronitrile with relatively low decomposition temperature can be preferable for the present invention. About 0.05 to about 0.20 parts by weight of fat-soluble polymerization initiator is used based on about 100 parts by weight of the ABS graft copolymer (A).

The water-soluble polymerization initiator used in the second step (II) of graft reaction includes potassium persulfate, sodium persulfate, ammonium persulfate, silver persulfate, and the like, and about 0.30 to about 0.80 parts by weight of the water-soluble polymerization initiator can be preferably used based on about 100 parts by weight of final g-ABS copolymer (A).

The redox based initiating catalyst for the first and second graft polymerization can be preferably mixture of about 0.0005 to about 0.006 parts by weight of ferrous sulfate, about 0.01 to about 0.15 parts by weight of sodium pyrophosphate, and about 0.05 to about 0.15 parts by weight of dextrose, and the polymerization initiator preferably about 0.2 to about 0.5 parts by weight of cumene hydroperoxide.

If the kind of the polymerization initiator and the initiation catalyst is not selected from said condition, the production of the graft copolymer of the preset invention is impossible, and when the amount is less than said range, the proper graft ratio is incapable of securing, and non-reacted monomers increase, thereby producing an excessive amount of non-graft polymers. However, when the content of the polymerization initiator exceeds said range, the polymerization is unstable by the increase of reaction speed, and the generation of coagulation increases.

No specific limit is required for the emulsifier, and a general emulsifier for conventional emulsion polymerization can be used. For instance, rosin acid potassium, sodium laurylate, sodium oleate, potassium oleate, potassium stearate, sodium lauryl sulfate, or a combination thereof can be used. About 0.3 to about 1.5 parts by weight of emulsifier can be preferably used based on the final g-ABS copolymer (A). If the emulsifier is used less than about 0.3 parts by weight, the generation of coagulation increases and the polymerization stability decreases, and if the emulsifier is used greater than about 1.5 parts by weight, controlling physical properties of the graft polymer such as graft ratio can be difficult, thereby generating problems of the decrease of outer appearance due to the generation of gas during an injection molding process of the final product.

Mercaptans, terpinolene or α-methyl styrene oligomer can be used as molecular weight control agent, and preferably the mercaptans can be used. The amount of the molecular weight control agent can be preferably about 0.1 to about 1.0 parts by weight based on about 100 parts by weight of the g-ABS copolymer (A). When the amount of the molecular weight control agent is less than about 0.1 parts by weight, the outer appearance and impact resistance of the final product degrade due to the control ability decrease of the graft ratio, and the flowability of the product decreases. When the amount of the molecular weight control agent is greater than about 1.0 parts by weight, productivity is degraded due to slow polymerization speed, the impact resistance and physical properties are degraded due to excessive graft ratio, and gas is generated due to the oligomer.

The present invention will be further comprehensive in the following examples, and the following examples are intended for the purposed of illustration and are not be construed as in any way limiting the scope of the present invention.

EXAMPLES AND COMPARATIVE EXAMPLES

Example 1

(1) First Step

About 50 parts by weight of polybutadiene rubber with an average particle diameter of about 0.08 μm, gel content of about 80%, and a swelling index of about 20; about 3.5 parts by weight of methyl methacrylate; about 1.0 parts by weight of styrene; about 0.5 parts by weight of acrylonitrile; about 150 parts by weight of ion-exchanged water; about 1.0 parts by weight of rosin acid potassium, about 0.5 parts by weight of n-dodecyl mercaptan, and about 0.5 parts by weight of cumene hydroxyperoxide are inserted into a glass reactor equipped with a stirring impeller, a thermometer for controlling the temperature, a mantle, and a cooling water circulation device, and stirred properly before increasing the internal temperature of the reactor to about 60° C. A redox based initiating catalyst is inserted into the reaction product, and polymerization is performed for an hour for proceeding the first graft reaction until the polymerization conversion rate reaches about 90%.

(2) Second Step

When the first step is finished, polymerization initiator is inserted into the reactor at once, and monomer mixture (a2) stored in a separate container capable of successively supplying, and molecular weight control agent are continuously supplied into the reactor for about 3 hours for proceeding the second graft reaction. The monomer mixture comprises about 31.5 parts by weight of methyl methacrylate, about 9 parts by weight of styrene, and about 4.5 parts by weight of acrylonitrile. The reaction is terminated after aging the product for an hour when the continuous insertion is finished.

Acrylonitrile-butadiene-styrene graft (g-ABS) copolymer (A) after the termination of the reaction is cooled at room temperature, and coagulated, dehydrated, and dried to obtain powder. The weight average molecular weight of the graft acrylonitrile-styrene (g-SAN) of copolymer (A) powder is about 85,000 g/mol.

(3) Third Step

About 6% by weight of g-ABS copolymer (A) produced by the first and second steps, and about 92% by weight of previously prepared styrene-acrylonitrile based copolymer (B) are mixed, and about 5 parts by weight of additives is added based on about 100 parts by weight of the sum of (A) and (B) for finishing the production of transparent ABS resin composition. 8 parts by weight of polybutadiene rubber is included based on about 100 parts by weight of the total resin composition.

Example 2

The reaction is proceeded in the same method with Example 1 except for the usage of the polybutadiene rubber having an average particle diameter of about 0.12 µm, and a ratio of the monomer mixture of methyl methacrylate/styrene/acrylonitrile as about 74/24/6.

Example 3

The reaction is proceeded in the same method with Example 2 except for the usage of the polybutadiene rubber having an average particle diameter of about 0.14 µm.

Comparative Example 1

The reaction is proceeded in the same method with Example 1 except for the usage of the polybutadiene rubber having an average particle diameter of about 0.20 µm.

Comparative Example 2

The reaction is proceeded in the same method with Example 2 except for the usage of the polybutadiene rubber having an average particle diameter of about 0.05 µm.

Comparative Example 3

The reaction is proceeded in the same method with Example 1 except for the usage of g-ABS copolymer with graft ratio of about 45%.

Comparative Example 4

The reaction is proceeded in the same method with Example 1 except for the usage of g-ABS copolymer with graft rate of about 82%.

Comparative Example 5

The reaction is proceeded in the same method with Example 1 except for mixing about 40% by weight of g-ABS copolymer (A) and about 60% by weight of SAN based copolymer (B).

Production of Specimen

Other additives are mixed with the resin composition from Examples and Comparative Examples before extruding and processing, for producing thermoplastic resin composition in a pellet form. The extrusion uses a twin-screw extruder with L/D of about 29, and the diameter of about 45 mm, and the barrel temperature is set at about 230° C. Pellets are dried at about 80° C. for about 2 hours before producing specimen in the size of about 9 cm×5 cm×0.2 cm at a cylinder temperature of about 240° C. and a mold temperature of about 60° C., using 6 oz injection molding machine.

Method of Evaluating Physical Properties (1) Transparency (haze value) is measured in accordance with ASTM D1003.

(2) Impact strength (un-notched Izod impact strength) of a specimen with ¼" is measured in accordance with ASTM D256.

(3) Pencil hardness is measured in accordance with ASTM D3363.

TABLE 1

|  |  | Examples | | | Comparative Examples | | | | |
| --- | --- | --- | --- | --- | --- | --- | --- | --- | --- |
|  |  | 1 | 2 | 3 | 1 | 2 | 3 | 4 | 5 |
| Butadiene based rubber polymer (a1) | | 50 | 50 | 50 | 50 | 50 | 50 | 50 | 50 |
| Monomer mixture (a2) | Acrylate based monomer | 35 | 37 | 37 | 35 | 35 | 35 | 35 | 35 |
|  | Styrene based monomer | 10 | 12 | 12 | 10 | 10 | 10 | 10 | 10 |
|  | Acrylonitrile based monomer | 5 | 3 | 3 | 5 | 5 | 5 | 5 | 5 |
| Average particle diameter of rubber polymer (µm) | | 0.08 | 0.12 | 0.14 | 0.20 | 0.05 | 0.08 | 0.08 | 0.08 |

(Unit: parts by weight)

TABLE 2

|  | Examples | | | Comparative Examples | | | | |
| --- | --- | --- | --- | --- | --- | --- | --- | --- |
|  | 1 | 2 | 3 | 1 | 2 | 3 | 4 | 5 |
| g-ABS copolymer (A) | 6 | 10 | 13 | 6 | 6 | 6 | 6 | 40 |
| SAN based copolymer (B) | 94 | 90 | 87 | 94 | 94 | 94 | 94 | 60 |
| Impact strength ¼" (kgf · cm/cm) | 38 | 36 | 35 | 21 | 30 | 22 | 30 | 35 |
| Haze (%) | 0.6 | 0.8 | 0.9 | 0.9 | 1.9 | 1.5 | 1.8 | 3.0 |
| Pencil hardness | 2H | 2H | H | H | H | H | H | HB |

As shown in above Table 2, Examples 1-3 exhibit excellent transparency without degrading impact resistance and scratch resistance. Also, Example 1 exhibits excellent particle dispersion stability based on TEM image of Example 1 as shown in FIG. 1.

Figure 2:
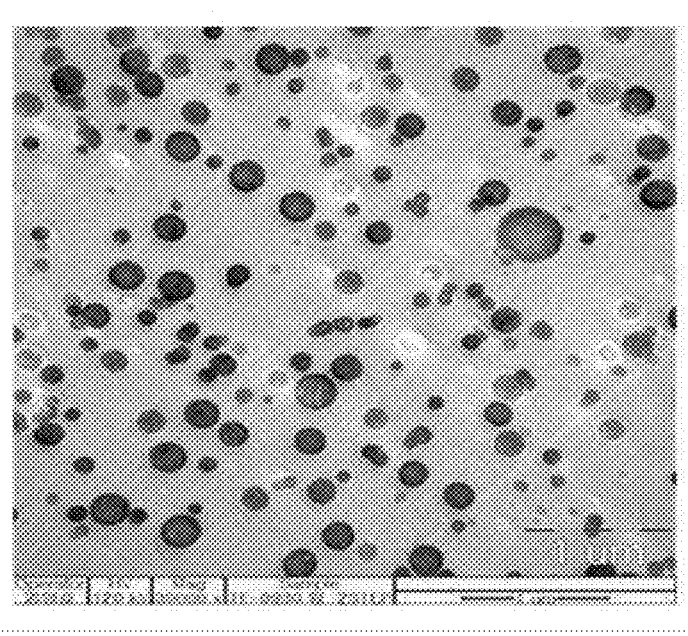
FIG. 2 is a TEM photograph of Comparative Example 1.
Figure 3:
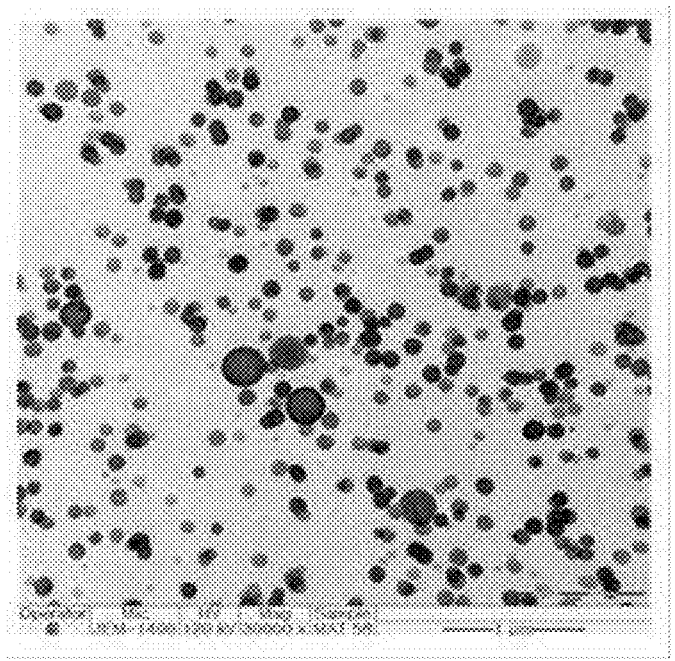
FIG. 3 is a TEM photograph of Comparative Example 4.

However, Comparative Example 1, which includes relatively large g-ABS copolymer particles, exhibits degraded impact strength. Comparative Example 2, which includes relatively small g-ABS copolymer particles, exhibits degraded transparency. Additionally, Comparative Examples 3 and 4, which contain g-ABS copolymer having out of range of preferable graft ratio, both impact resistance and transparency are degraded compared with Examples. Comparative Example 5 exhibits remarkably degraded transparency and degraded scratch resistance. Also, based on a TEM image of Comparative Example 1 shown in FIG. 2 and a TEM image of Comparative Example 4 shown in FIG. 3, the particle dispersion stability of Comparative Examples are poorer than Example 1.

The simple change and transformation of the present invention are capable of being easily used for users with common knowledge in the field, and the entire change and transformation are included in the scope of the present invention.

That which is claimed is:

1. A transparent ABS resin composition comprising:
   (A) an acrylonitrile-butadiene-styrene graft (g-ABS) copolymer in which a monomer mixture of acrylate based monomer, styrene based monomer, and acrylonitrile based monomer (a2) is copolymerized onto a butadiene based rubber polymer (a1); and
   (B) a styrene-acrylonitrile based copolymer,
   wherein the transparent ABS resin composition satisfies the following Equation 1 and Equation 2:

$0 \le |X-Y| \le 0.005$ (Equation 1)

$0 \le |X-Z| \le 0.005$ (Equation 2)

wherein the X is refractive index of the acrylonitrile-butadiene-styrene graft (g-ABS) copolymer (A), the Y is refractive index of the butadiene based rubber polymer (a1), and the Z is refractive index of the styrene-acrylonitrile based copolymer (B), and
   wherein the transparent ABS resin composition has a haze value of less than 1.0% and un-notched IZOD impact strength (¼") of about 30 kgf·cm/cm or more.

2. The transparent ABS resin composition of claim 1, wherein the transparent ABS resin composition comprises about 5 to about 75% by weight of the g-ABS copolymer (A), and about 25 to about 95% by weight of the styrene-acrylonitrile based copolymer (B).

3. The transparent ABS resin composition of claim 1, wherein the monomer mixture of the acrylate based monomer, the styrene based monomer, and the acrylonitrile based monomer (a2) is copolymerized onto the butadiene based rubber polymer (a1) in a graft ratio of about 55 to about 80%.

4. The transparent ABS resin composition of claim 1, wherein the g-ABS copolymer (A) comprises about 40 to about 60% by weight of the butadiene based rubber polymer (a1), and about 40 to about 60% by weight of the monomer mixture (a2).

5. The transparent ABS resin composition of claim 1, wherein the monomer mixture (a2) comprises about 40 to about 80% by weight of the acrylate based monomer, about 10 to about 40% by weight of the styrene based monomer, and about 1 to about 20% by weight of the acrylonitrile based monomer.

6. The transparent ABS resin composition of claim 1, wherein the styrene-acrylonitrile based copolymer (B) comprises about 40 to about 80% by weight of acrylate based monomer, about 10 to about 40% by weight of styrene based monomer, and about 1 to about 20% by weight of acrylonitrile based monomer.

7. The transparent ABS resin composition of claim 1, wherein the butadiene based rubber polymer (a1) is polybutadiene, styrene-butadiene copolymer, or a combination thereof.

8. The transparent ABS resin composition of claim 1, wherein the butadiene based rubber polymer (a1) has an average particle diameter of about 0.07 to about 0.15 μm, a gel content of about 60 to about 95% by weight, and a swelling index of about 10 to about 30.

9. The transparent ABS resin composition of claim 1, wherein the acrylate based monomer is $C_2$ to $C_{20}$ (meth) acrylic acid alkyl ester.

10. The transparent ABS resin composition of claim 1, wherein the styrene based monomer is selected from the group consisting of styrene, α-ethyl styrene, α-methyl styrene, p-methyl styrene, o-t-butyl styrene, bromo styrene, chloro styrene, trichloro styrene, and combinations thereof.

11. The transparent ABS resin composition of claim 1, wherein the acrylonitrile based monomer is acrylonitrile, methacrylonitrile, fumaronitrile, or a combination thereof.

12. The transparent ABS resin composition of claim 1, wherein the transparent ABS resin composition has a weight average molecular weight of about 30,000 to about 100,000 g/mol.

13. The transparent ABS resin composition of claim 1, wherein the transparent ABS resin composition comprises one or more additives selected from the group consisting of thermal stabilizers, releasing agents, dispersing agents, anti-dripping agents, weather resistant agents, inorganic fillers, and inorganic fibers.

14. The transparent ABS resin composition of claim 1, wherein the transparent ABS resin composition has a pencil hardness of H to 2H.

* * * * *